United States Patent [19]

Ortiz, Jr.

[11] Patent Number: 5,159,402
[45] Date of Patent: Oct. 27, 1992

[54] OPTICAL SENSOR SAFETY SYSTEM FOR MONITORING LASER CRYSTALS AND OPTICAL COMPONENTS

[75] Inventor: Angel L. Ortiz, Jr., Scotia, N.Y.

[73] Assignee: General Electric Comany, Schenectady, N.Y.

[21] Appl. No.: 499,228

[22] Filed: Mar. 26, 1990

[51] Int. Cl.⁵ .................. G01N 21/00; H01S 3/13
[52] U.S. Cl. .................... 356/237; 356/239; 372/31
[58] Field of Search ........... 356/237, 218, 213, 224, 356/121, 239; 250/205, 493.1, 505.1, 227.15, 227.11; 372/29-31; 219/121.83, 121.61, 121.63

[56] References Cited

U.S. PATENT DOCUMENTS

| | | | |
|---|---|---|---|
| H376 | 12/1987 | Bremer | 350/239 |
| 3,473,030 | 10/1969 | Mevers et al. | 372/31 |
| 3,633,126 | 1/1972 | Martin et al. | 331/94.5 |
| 3,806,829 | 4/1974 | Duston et al. | 331/94.5 |
| 3,988,068 | 10/1976 | Sprague | 356/239 |
| 4,027,982 | 6/1977 | Ohishi | 356/237 |
| 4,311,142 | 1/1982 | Machida | 128/303.1 |
| 4,423,726 | 1/1984 | Imagawa et al. | 128/303.1 |
| 4,564,736 | 1/1986 | Jones et al. | 219/121 L |
| 4,672,215 | 6/1987 | Howard | 250/566 |
| 4,676,586 | 6/1987 | Jones et al. | 350/96.20 |
| 4,681,396 | 7/1987 | Jones | 350/96.18 |
| 4,739,162 | 4/1988 | Ortiz, Jr. et al. | 250/227 |
| 4,772,772 | 9/1988 | Juptner et al. | 219/121.83 |
| 4,799,755 | 1/1989 | Jones | 350/96.18 |
| 4,838,631 | 6/1989 | Chande et al. | 350/6.6 |

FOREIGN PATENT DOCUMENTS

62-142091 6/1987 Japan .
63-207487 8/1988 Japan .

Primary Examiner—Davis L. Willis
Assistant Examiner—Hoa Pham
Attorney, Agent, or Firm—James R. McDaniel; James C. Davis, Jr.; Paul R. Webb, II

[57] ABSTRACT

The present monitoring system for monitoring operation of a laser system includes, in one embodiment, respective optical sensors coupled to respective, selected optical components. Each optical sensor, in operation, generates signals indicative of optical signal radial leakage of a respective optical component. When the radial leakage of a respective optical component. When the radial leakage-indicative signal from an optical sensor exceeds a predetermined threshold, operation of the laser system is interrupted.

18 Claims, 5 Drawing Sheets

OPTICAL SENSOR SAFETY SYSTEM FOR MONITORING LASER CRYSTALS AND OPTICAL COMPONENTS

The present invention is related to laser materials processing systems, and more particularly, to an optical sensor safety system for monitoring operation of laser systems and associated optical components.

RELATED APPLICATIONS

The present application is related to copending commonly assigned U.S. Pat. No. 4,960,970 and U.S. patent application Ser. Nos. 07/487,092 and 07/489,306, respectively, entitled "Method and Apparatus For Acoustic Breakthrough Detection", "Method and Apparatus For Optically/Acoustically Monitoring Laser Materials Processing" and "Method and Apparatus For Optically Monitoring Laser Materials Processing", respectively, issued Oct. 2, 1990, and filed Mar. 2, 1990 and Mar. 5, 1990, both now allowed.

BACKGROUND OF THE INVENTION

Laser materials processing as known in the art and used herein refers to performance of materials processes, such as cutting, welding, drilling and soldering, using a continuous wave or pulsed laser beam. The average power of such a laser beam may range from as little as approximately one watt to hundreds of watts, the specific power being selected on the basis of the particular process being performed. Laser beam power required for materials processing generally is much greater than laser beam power required for other laser-based systems such as communication systems.

A laser beam source, i.e., a laser resonator, typically includes a laser head having a crystal, such as a face-pumped laser as described in commonly assigned U.S. Pat. No. 3,633,126, "Multiple Internal Reflection Face-Pumped Laser", disposed therein. The crystal may, for example, have a rectangular cross-sectional shape and have six surfaces including respective pumping and cooling surfaces. In operation, energy is injected, i.e. pumped, into the crystal through the pumping surfaces. Laser crystal flashlamps, sometimes referred to herein as laser flashlamps, disposed within the laser head and along axes parallel to the pumping surfaces usually are utilized as pumping means. The laser flashlamps are coupled to a high energy power supply. The crystal is cooled, for example, by flowing coolant along the crystal surfaces. As is known in the art, the slab crystal has two crystal surfaces which are finished to brewster's angle. When operating as a laser resonator, a beam to be utilized for processing is emitted from one of the finished crystal surfaces.

Optical components such as lenses and mirrors form part of the laser resonator and are disposed for extracting a high power laser beam from the crystal volume. A beam expanding lens combination and a focusing lens may be aligned with the laser resonator for shaping an emitted beam to be utilized in processing.

A laser head may operate in a pulsed mode or in a continuous mode. A pulsed mode means that pulses of beams are emitted from the laser resonator. Such pulses of beams are obtained by exciting, i.e., energizing, the crystal with pulses of energy, e.g., pulsing the laser flashlamps. A continuous mode means that a continuous beam is emitted from the laser resonator. Such a continuous beam is obtained by providing continuous energy to the crystal, e.g., by leaving the laser flashlamps on.

A laser head may be configured to operate as a laser oscillator or as a laser amplifier. When operating as an oscillator, the crystal is excited to a state wherein the crystal emits electromagnetic energy. When operating as an amplifier, the crystal is excited and, simultaneous with crystal excitation, a beam of electromagnetic energy from a separate source is injected into the crystal. As the beam travels through the crystal, it is amplified due to the excited state of the crystal. An amplified beam is then emitted from the finished surface of the crystal.

In operation of the crystal in either mode, energy emitted from the laser flashlamps is injected into the crystal, through the pump surfaces, and excites, or optically pumps, the crystal. The laser beams generated are very narrow beams of radiation and the intensity within the beams is exceptionally high.

Fast pulse repetition rates or long continuous mode operation of the crystal causes heat to be generated within the crystal. The crystal, in normal operation, may be cooled by flowing a coolant along the crystal cooling surfaces. If an optical component, e.g., a mirror, within the laser resonator becomes damaged or if some other abnormality occurs within the laser source during an operation, the crystal could discontinue lasing, i.e., discontinue emitting a laser beam. The laser flashlamps, however, will continue pumping the crystal. More specifically, if the laser flashlamps are pumping the crystal above the lasing threshold, and if the crystal is not emitting a laser beam, then parasitics i.e., irregular lasing paths, may develop within the crystal. The appropriate action in these circumstances usually is to stop energizing the crystal, such as by turning off the laser flashlamp power supply.

Damaging optical components, and especially the crystal, is undesirable because, among other things, laser crystals are expensive and replacements may not be readily available. Also, if a component becomes damaged, the laser source usually must be shut down to make repairs. Shutting down operation of the laser source for a long period of time may be very costly, especially if the laser source is part of an assembly line. The whole line may have to be shut down as a result of laser source failure.

It would be beneficial, therefore, to provide a means for detecting abnormal operations within a laser source so that timely appropriate actions may be taken to prevent damage, or further damage, to the crystal and other optical components.

It would also be beneficial to provide means for detecting abnormal operations throughout an entire laser processing system. For example, a laser system may include, in addition to a laser source, an optical fiber and an output coupler. Transmission of laser beams through optical fibers, at power levels suitable for performing materials processing, greatly enhanced the flexibility of laser-based materials processing systems. Various techniques for the efficient injection of a high power laser beam from a laser source into an optical fiber for transmission therethrough are disclosed, for example, in commonly assigned U.S. Pat. Nos. 4,564,736; 4,676,586; and 4,681,396 respectively entitled "Industrial Hand Held Laser Tool and Laser System", "Apparatus and Method for Performing Laser Material Processing Through a Fiber Optic", and "High Power Laser Energy Delivery System". Generally, lenses adjacent a laser source are utilized to focus a beam onto an input end of an optical fiber, and these lenses may be referred to herein, collectively, as a fiber injection unit.

An output end of the optical fiber is disposed in an output coupling device, sometimes referred to herein as an output coupler, which includes means to collimate and focus the beam emitted from the fiber output end. The output coupling device is moved relative to a workpiece by, for example, a computer-controlled robotic arm. With optical fiber transmission, a system user must monitor, during the processing and in addition to the laser source, a fiber injection unit, an output coupler, and an optical fiber. Failure of any one component may result in failure of the entire system.

Also available to enhance laser materials processing are systems for time sharing of a materials processing laser beam among a plurality of optical fibers. Such systems are described in commonly assigned U.S. Pat. Nos. 4,739,162 and 4,838,631 entitled "Laser Beam Injecting System" and "Laser Beam Directing System", respectively. Manufacturers of beam time sharing systems include Robolase Systems, Inc. of Costa Mesa, Calif. and Lumonics Corporation of Livonia, Mich. By the use of such beam time sharing systems, a beam generated by one laser source can be shared among multiple optical fibers. The respective output ends of each optical fiber may be positioned proximate respective process points on one or more workpieces. Laser beam time sharing systems, sometimes referred to herein as multiplexers, have further increased the flexibility and efficiency of laser materials processing. With a multiplexer-based laser system, the system user must monitor a laser source, a multiplexer, multiple beam injecting systems, multiple couplers, and multiple optical fibers. The sequence of optical components in such systems is sometimes referred to herein as an optical train.

A monitoring system for monitoring laser system components preferably facilitates obtaining desired processing results and aids in preventing damage to the components. The monitoring system, however, should not slow down laser materials processing operations. Otherwise, advantages of utilizing optical fiber/laser technology, such as a reduction in processing time, may be lost. Further, it is preferred that the monitoring system operate in substantially real-time. The monitoring system preferably should be able to obtain data simultaneous with materials processing so that if adjustments to components are needed, such adjustments can be made before further damaging processing components.

It is therefore an object of the present invention to provide a system for monitoring and detecting an onset of abnormal operation of laser processing components so that appropriate action, such as laser flashlamp power supply turn-off, may be taken in a timely manner.

Another object of the present invention is to provide a system for monitoring laser source operation including the performance of optical components disposed within the laser source.

Still another object of the present invention is to provide a system for monitoring laser beam transmission through an optical fiber and through output coupler optical components.

Still yet another object of the present invention is to provide a system which monitors, in substantially real time, laser materials processing components in a manner that does not slow laser materials processing.

SUMMARY OF THE INVENTION

The present optical sensor safety system for monitoring laser materials processing components includes optical sensors, such as photodiodes, mounted or adhesively attached to optical components of a laser system. The optical sensors are mounted so as to be able to detect radial leakage of optical signals transmitted/reflected by the optical components. As radial leakage in an optical component increases, a signal generated by the respective optical sensor increases in magnitude. Each optical sensor is coupled to a means for determining whether a signal generated by an optical sensor has exceeded a predetermined threshold. The determining means is coupled to a power source interrupt means, such as a laser safety interlock which turns off the laser flashlamp power source.

In normal operation, signals received from each optical sensor mounted to an optical component should have a small magnitude. That is, in normal operation, optical component radial leakage is very small. If an optical component becomes damaged, however, the optical component will begin exhibiting less efficient transmission characteristics. One such characteristic is increased radial leakage of optical signals. The optical sensor mounted to the component will generate a signal of greater magnitude indicative of the increased radial leakage.

If the sensor signal exceeds the predetermined threshold, the power source interrupt means will be triggered, thereby cutting off power to the laser flashlamps. Lasing will terminate and any further damage to processing components due to component malfunction will be prevented.

The present system detects the onset of abnormal laser processing component operation and facilitates timely action to prevent further damage to the laser source and other laser system components. The present system can be utilized for monitoring components within a laser source as well as components throughout an entire laser system. Further, the present invention monitors, in substantially real time, laser materials processing components in a manner that does not slow laser materials processing.

BRIEF DESCRIPTION OF THE DRAWINGS

These and other objects of the present invention, together with further features and advantages thereof, will be apparent from the following detailed specification when read together with the accompanying drawings, in which.

DETAILED DESCRIPTION OF THE DRAWINGS

Figures 1A, 2A:
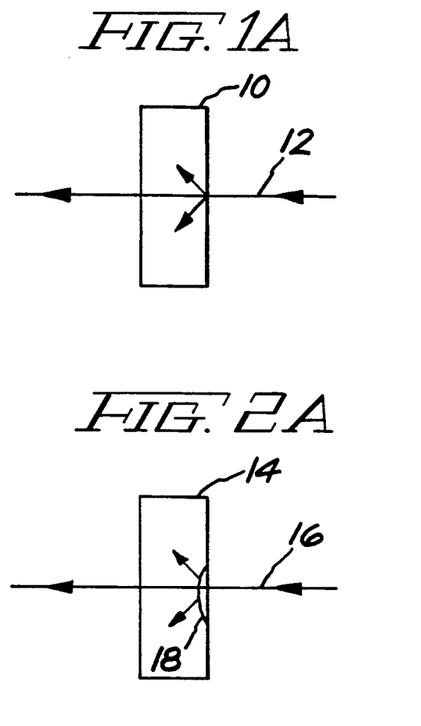
FIGS. 1A-B illustrate side and front views, respectively, of an undamaged lens having a laser beam transmitted therethrough.
FIGS. 2A-B illustrate side and front views, respectively, of a damaged lens having a laser beam transmitted therethrough.
Figures 1B, 2B:
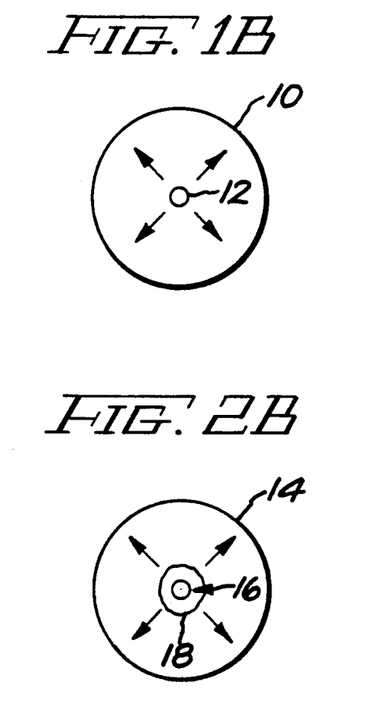

Referring now more particularly to the drawings, FIGS. 1A-B illustrate side and front views, respectively, of an undamaged mirror 10 having a laser beam 12 transmitted therethrough. As shown in FIGS. 1A-B, as laser beam 12 is transmitted through mirror 10, a small magnitude of radial leakage will occur, as diagrammatically indicated by small arrows pointing radially outward from beam 12.

FIGS. 2A-B illustrate side and front views, respectively, of a damaged mirror 14 having a laser beam 16 transmitted therethrough. A damaged portion 18 of mirror 14 illustrates that a coating, such as an antireflection coating, of mirror 14 has been damaged. Such coatings are well known in the art and typically used in high power beam transmission. As beam 16 is transmitted through damaged mirror 14, increased radial leakage occurs as diagrammatically indicated by large arrows extending radially outward from beam 16.

Figure 3A:
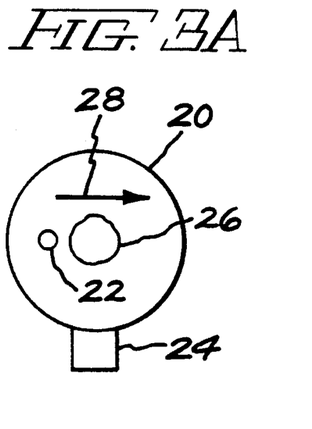
FIGS. 3A-B illustrate scanning a damaged lens and a signal generated, during the scan, by a photodiode mounted to the lens, respectively.

FIGS. 3A-B illustrate scanning a damaged mirror 20 with a laser beam 22. As shown in FIG. 3A, an optical sensor 24, such as a photodiode or phototransistor, is mounted to mirror 20. Such mounting may be achieved by using an optically transmissive adhesive or a mounting bracket which maintains the photodiode in contact with the optical component. Mirror 20 also includes a damaged portion 26. Beam 22 was scanned across mirror 20 along an axis parallel to arrow 28 and through a center of mirror 20. Therefore, beam 22 passed through damaged portion 26.

Figure 3B:
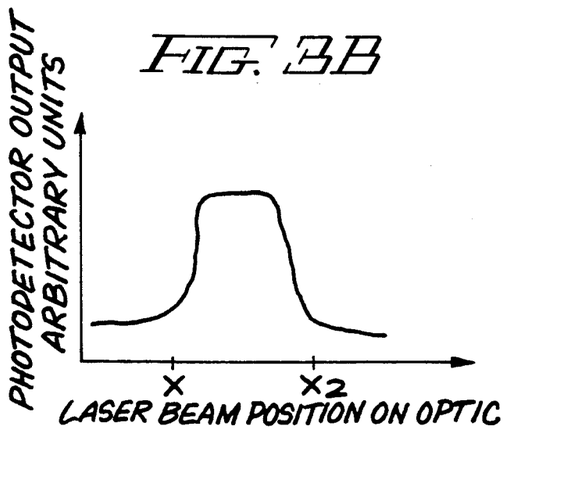

FIG. 3B illustrates an electrical signal generated by optical sensor 24 during the scan operation. In the FIG. 3B graph, the x-axis is assigned units of laser beam position on mirror 20 and the y-axis is assigned arbitrary units of radial leakage intensity. Positions $X_1$ and $X_2$ along the axis indicate locations at which damage portion 26 begins and ends, respectively. As is clear from FIG. 3B, once beam 22 encounters damaged portion 26, radial leakage increases. This increase in radial leakage is detected by optical sensor 24 which generates, as a result, an increased magnitude signal. The increased radial leakage continues until beam 22 has fully passed through damaged portion 26. Once the beam has fully traversed through the damaged portion, radial leakage intensity decreases to its normal magnitude thereby indicating a normal optical quality surface.

The increase in radial leakage as illustrated in FIGS. 3A-B may result from damage to a mirror coating or other abnormal component operation, such as melting of an optical component substrate. It should be understood, therefore, that the present invention is not limited to practice with mirrors having coatings. Rather, the present invention detects an increase in radial leakage regardless of whether the component has such a coating.

Figure 4:
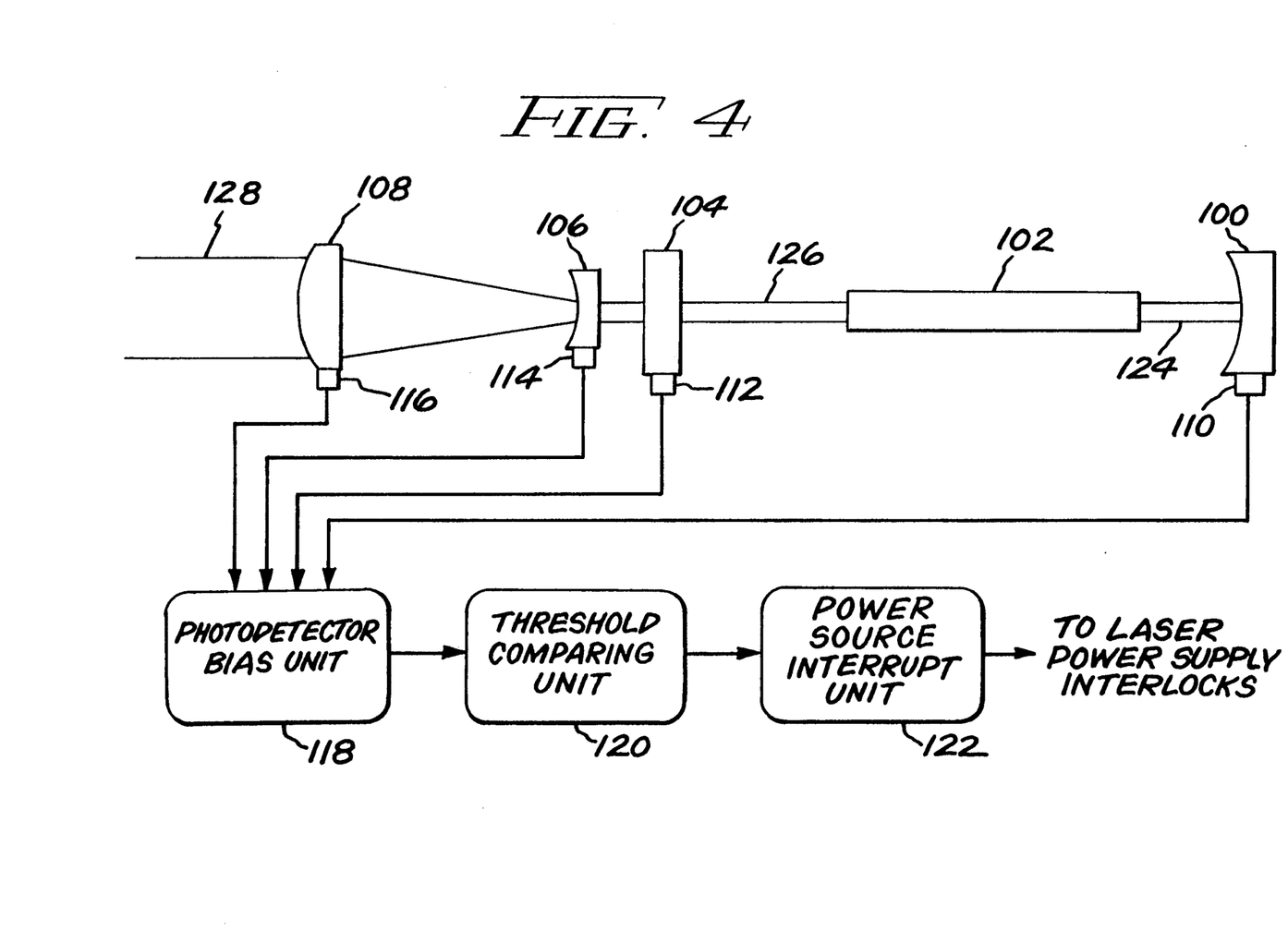
FIG. 4 illustrates a first embodiment of a monitoring system in accordance with the present invention.

FIG. 4 illustrates a first embodiment of a monitoring system in accordance with the present invention. The monitoring system in FIG. 4 is shown in combination with a laser source which includes a back cavity spherical mirror 100, a laser crystal 102, a laser output coupler mirror 104, and a beam expanding unit including optical lenses 106 and 108. The back cavity spherical mirror, the crystal, and the coupler mirror compose a laser resonator. It should be understood that the present invention is not dependent upon specific components and can be utilized in combination with many other laser sources including many other optical components. Further, the present system could be implemented in an optical fiber output coupler, beam multiplexer, and many other laser system components.

As shown in FIG. 4, the present monitoring system includes optical sensors such as photodiodes 110, 112, 114, and 116 mounted to each optical component. The photodiodes may, for example, be photodiode model # YAG-100A manufactured by EG&G of Salem, Mass. The photodiodes, however, need not be mounted to each optical component and could be mounted to a limited number of selected optical components. The photodiodes may be adhesively attached to the optical components by utilizing a light transmissive adhesive or the photodiodes may be mechanically maintained in contact with the components, for example, by adapting a lens holder to include an opening for the photodiode.

Each photodiode includes a filter which transmits a single wavelength. For example, in an Nd:YAG based system, which system generates a beam having a wavelength of 1.06 μm, each photodiode filter would be configured to transmit only 1.06 μm wavelength signals. Therefore, only signals directly related to the laser beam would be transmitted through the filter and all other signals would be blocked. Each photodetector is coupled to a photodetector bias unit 118 which is coupled to a threshold comparing unit 120. The threshold comparing unit is coupled to a power source interrupt unit 122 which, as shown in FIG. 4, is coupled to a laser power supply interlock, such as a relay for controlling the opening and closing of a switch which interrupts energizing the laser flashlamps.

Before operation, a threshold value for threshold comparing unit 120 must be determined. The threshold value may be determined, for example, by initially operating the laser source at a low power level. The threshold level may be adjusted during the low power operation so that the threshold level is just above the detected normal operating radial leakage. As the power level of the source is increased, the operator simultaneously increases the threshold level so that laser flashlamp power is not interrupted. When the high power operating level is reached, the system user sets the threshold at a level which allows operation up to a maximum amount of allowable radial leakage, typically at a level just above radial leakage detected at the high power operating level.

In operation, laser flashlamps (not shown) optically pump crystal 102 which emits a first beam 124 which is reflected by spherical mirror 100 back into crystal 102. Crystal 102 also emits a second beam 126 which is transmitted, partially, by mirror 104. Beams 124 and 126 actually compose a single laser beam, but are described conceptually as two beams to facilitate an understanding of operation. Although the laser source is shown operating as a laser oscillator, the present monitoring system could be utilized when the source operates as a laser amplifier. The beam expanding unit including lenses 106 and 108 expands the beam transmitted by the mirror and forms a beam 128 which may be utilized for materials processing. Further optical components such as a fiber injection unit could be provided for focusing beam 128 into an optical fiber, as is known in the art, for transmission of the laser beam to an output coupler.

If each optical component of the laser source is undamaged, then each photodiode coupled to an optical component will generate a small magnitude signal. These signals are transmitted to the photodetector biasing unit which amplifies the signals received by the photodetectors. The amplified signals are then transmitted to the threshold comparing unit which compares the optical sensor signals with the predetermined threshold level. If an optical sensor signal exceeds the predetermined threshold, an output signal is generated by the threshold circuit and transmitted to power source interrupt unit 122. The interrupt unit then triggers the laser power supply interlock which, as hereinafter described, interrupts delivery of power to the laser flashlamps. Optical pumping of crystal 102 will stop thereby stopping lasing.

As described above, the present system detects the onset of abnormal laser processing component operation by detecting an increase in optical signal radial leakage through optical components. The present invention facilitates taking timely action, such as turning off power supplied to the laser flashlamps, to prevent damage to optical components of the laser system. Further, the present invention monitors, in substantially real time, laser materials processing components in a manner that does not slow laser materials processing.

As pointed out above, the system can be utilized for monitoring components within a laser source as well as components throughout an entire laser system optical train. Photodiodes simply would be mounted to other optical components throughout the laser system and coupled to the photodetector biasing unit.

Figure 5:
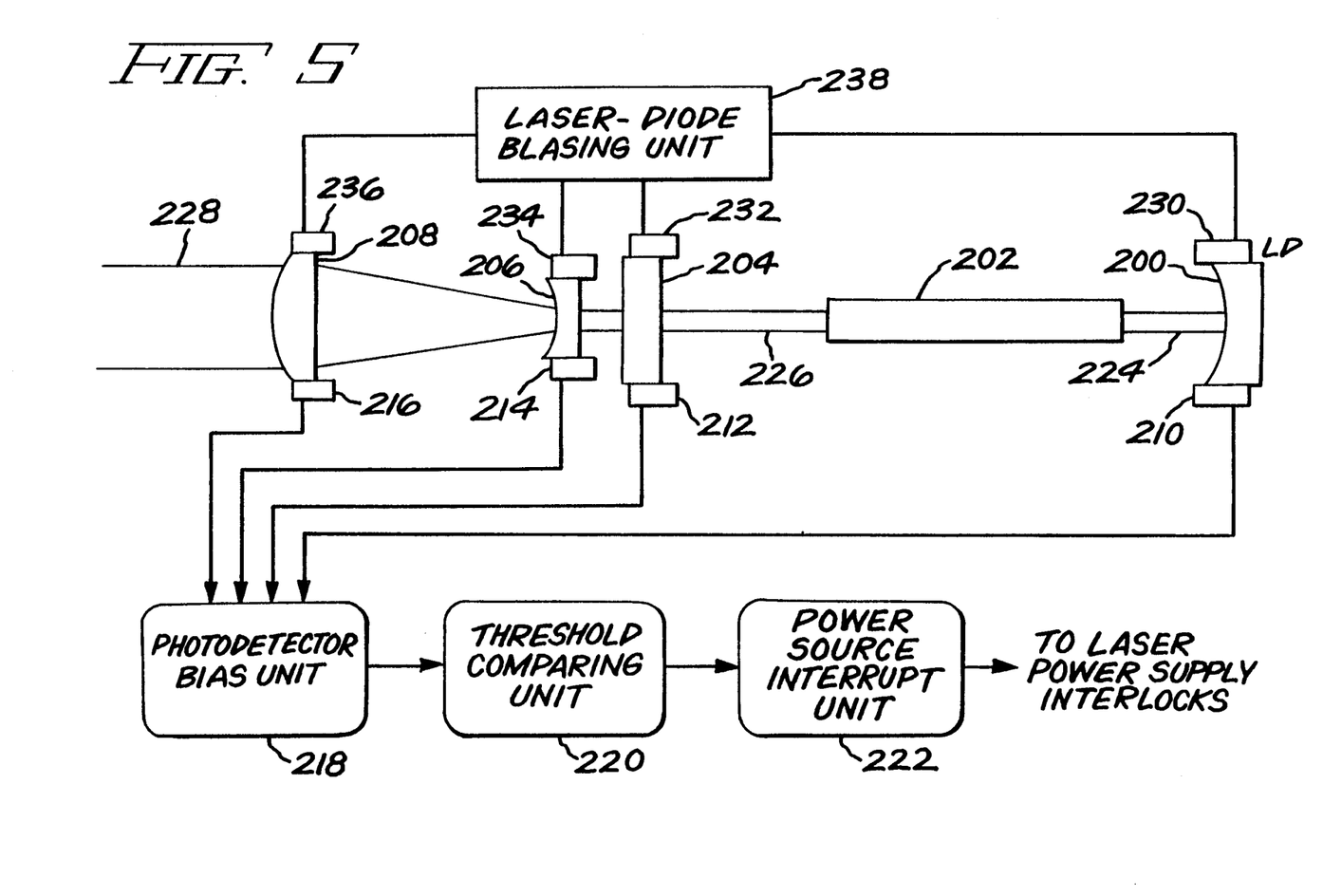
FIG. 5 illustrates a second embodiment of a monitoring system in accordance with the present invention.

FIG. 5 illustrates a second embodiment of a monitoring system in accordance with the present invention. The monitoring system in FIG. 5 is shown in combination with a laser source, such as the laser source illustrated in FIG. 4. The last two digits of reference numbers for components illustrated in FIG. 5 have the same last two digits as reference numbers for corresponding components, if any, shown in FIG. 4.

In the second embodiment illustrated in FIG. 5, and in addition to the previously described components, laser diodes 230, 232, 234, and 236 are mounted to respective optical components at substantially 180° from respective photodetectors. Each laser diode is coupled to a laser diode biasing unit 238 which supplies power to the laser diodes as known in the art. Each laser diode, as shown in FIG. 5, is mounted so that it emits a beam which traverses, in close proximity, a surface of a respective optical component. For each optical component, the surface which the laser diode beam traverses typically is the surface of the component at which a beam emitted from the crystal first encounters. The photodetectors are disposed so as to sense the laser diode emitted beam. As with the first embodiment, before operation, a threshold level must be predetermined. The threshold level may, for example, be set at a level just below the magnitude of the laser diode beam signal received by the photodetectors in normal operation.

In operation, each respective laser diode transmits a beam in very close proximity to the optical surface of each respective optical component. The photodetectors detect these beams, and as a result, generate a high magnitude signal. Each photodetector includes a filter so that only signals having a wavelength of a laser diode beam emitted by a laser diode affect the signal transmitted to photodetector bias unit 218.

The threshold comparing unit is set to trigger the interrupt unit when a signal from a photodetector falls below the predetermined level. Specifically, as damage to an optical component occurs, a beam transmitted by an associated laser diode will not be fully transmitted to the respective photodetector. When a lens or mirror becomes damaged, a plume typically results on the surface of the optical component where the laser beam is intercepted. The damaged portion of the lens, therefore, will interrupt, or at least partially interrupt, the laser diode generated beam. Therefore, the photodetector will detect a decrease in the signal transmitted by the respective laser diode. The result of these conditions will be a decrease in magnitude of the photodetector signal. As previously stated, if the photodetector signal falls below the predetermined threshold level, the power source interrupt unit will be triggered to cut off power to the laser flashlamps.

Figure 6:
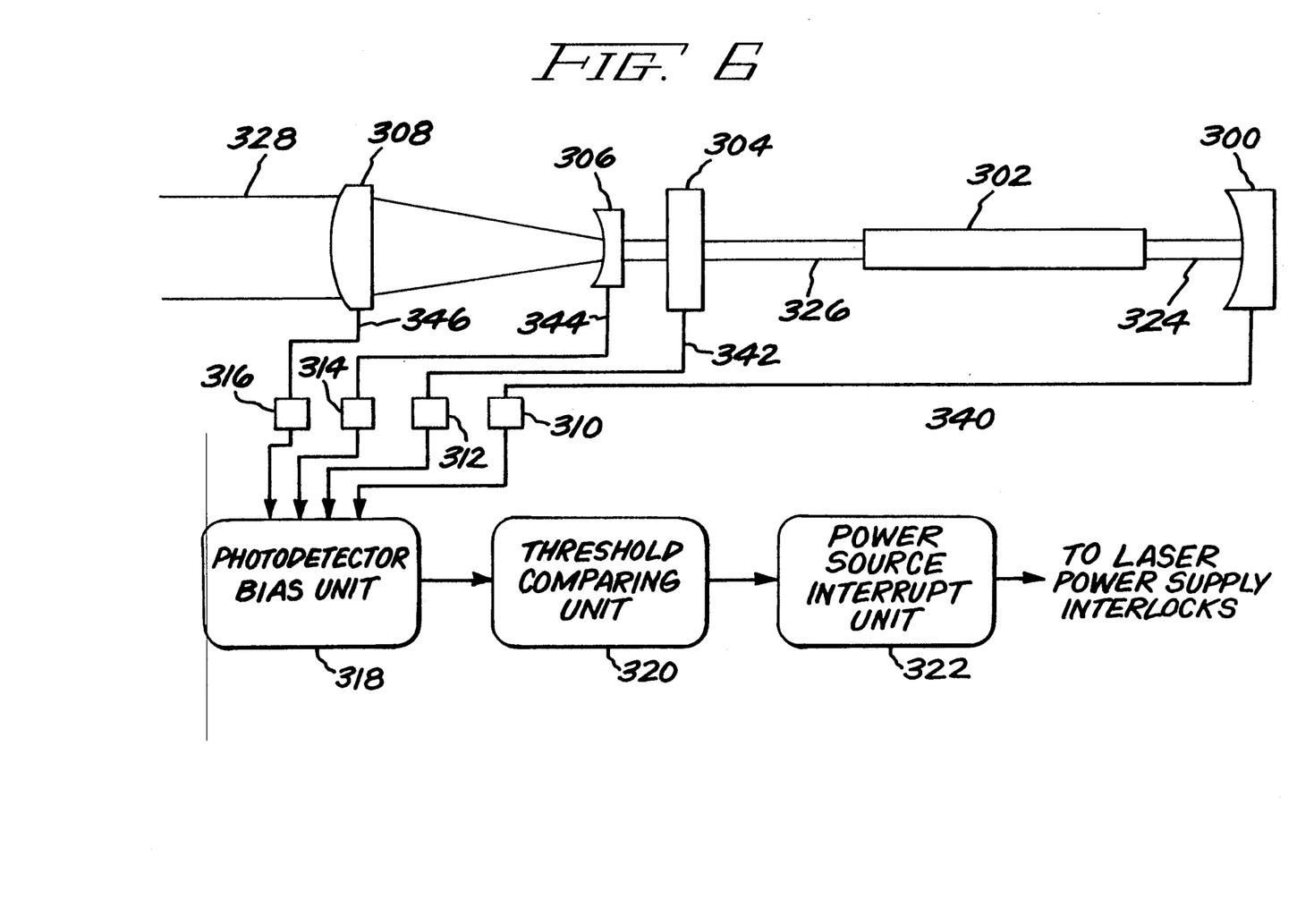
FIG. 6 illustrates a third embodiment of a monitoring system in accordance with the present invention.

FIG. 6 illustrates a third embodiment of a monitoring system in accordance with the present invention. The last two digits of reference numbers for components illustrated in FIG. 6 have the same last two digits as reference numbers for corresponding components, if any, shown in FIG. 4. In FIG. 6, optical fibers 340, 342, 344 and 346, each being coupled between a respective optical component and a respective photodetector, are utilized for transmitting optical signals from the optical components to the optical sensors. The optical fibers transmit, to the respective photodetectors, signals representative of the magnitude of radial leakage. Each optical fiber input end may be connected to an optical component by, for example, a light transmitting adhesive or utilizing mechanical holder. Utilizing optical fibers rather than directly coupling photodetectors to the optical components may be preferred in some situations where it is desirable to have the remaining portion of the safety monitoring system disposed remotely from the laser source. Operation of the embodiment illustrated in FIG. 6 is substantially similar to operation of the first embodiment illustrated in FIG. 4.

Figure 7:
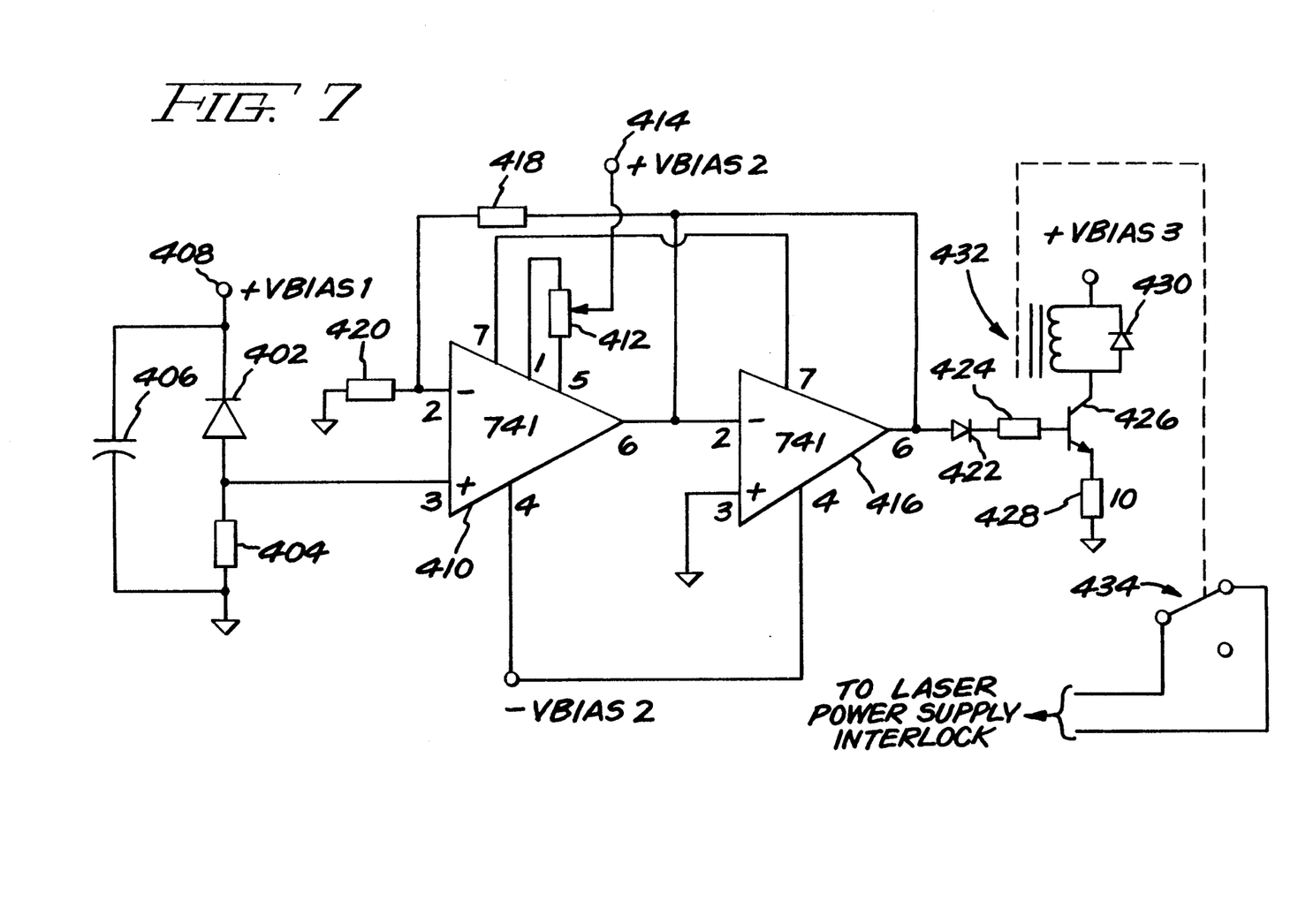
FIG. 7 illustrates a circuit schematic diagram of one embodiment of the present monitoring system.

FIG. 7 illustrates one embodiment of a biasing, threshold comparing, and power supply interruption circuit in accordance with the present monitoring system. The circuit schematic illustrated in FIG. 7 could be utilized in the first and third embodiments illustrated in FIGS. 4 and 6, respectively. For the second embodiment illustrated in FIG. 5, the threshold comparing circuit must be altered so that the switch is normally open. In this manner, and as described hereinafter in more detail, when the circuit is being driven, the switch is closed and power is supplied to the laser flashlamps.

An optical sensor is shown in the circuit schematic in FIG. 7 as a photodiode 402. It should be understood, of course, that the optical sensor could be a phototransistor or any optical sensor which generates an electrical signal which varies in magnitude according to the intensity of sensed light. As previously described, the photodiode is mounted to an optical component (not shown) such as a lens or mirror. A resistor 404 is coupled between the photodiode and ground, and capacitor 406 is coupled across photodiode 402 and resistor 404. A first biasing voltage labeled "+Vbias1" is applied at a node 408.

The non-inverting input for an operational amplifier 410, such as a 741 operational amplifier, is obtained from between photodiode 402 and resistor 404. The numerical markings shown in association with operational amplifier 410 in FIG. 7 correspond to pins of the 741 operational amplifier which is well known in the art. A threshold-adjust resistor 412, which preferably is an adjustable resistor, is coupled to a terminal 414 which, in turn, is coupled to a second biasing voltage "+Vbias2". The particular setting for resistor 412 is selected in accordance with a desired threshold level and may be determined, as previously described, through experimentation. The output from operational amplifier 410 is coupled as an inverting input to an operational amplifier 416, which also may be a 741 operational amplifier. As with operational amplifier 410, the numerical indications associated with operational amplifier 416 designate the pin locations of the 741 operational amplifier. A feedback resistor 418 and a resistor 420, coupled to ground, are connected to the inverting input of operational amplifier 410.

A diode 422 and a resistor 424 are coupled between operational amplifier 416 and a transistor 426. Resistor 428 is coupled between transistor 426 and ground. A diode 430 and a relay 432 coupled to transistor 426, as hereinafter explained, provide a means for interrupting the supply of power to laser flashlamps (not shown). A switch 434 is shown as being coupled to relay 432. A third biasing voltage, "+Vbias3", serves to bias the relay circuit.

An initial threshold level setting for resistor 412 is performed as hereinbefore described and resistor 412 is adjusted to prevent the switch 434 from being opened under normal conditions thereby interrupting the supply of power to the laser flashlamps. In operation, switch 434 is normally closed thereby allowing power to be supplied to the laser flashlamps from the power source. If the optical component becomes damaged, however, photodiode 402 will generate a higher magnitude signal due to increased radial leakage from the damaged optical component. This increased radial leakage increases the intensity of light impinging upon photodiode 402. As photodiode 402 generates an increased magnitude electrical signal, the voltage across resistor 404 increases. If the voltage across resistor 404 exceeds the predetermined threshold, operational amplifier 410 will generate an output signal. The output signal from operational amplifier 410 drives operational amplifier 416 which, in turn, energizes transistor 426. When transistor 426 turns on, relay 432 is energized. When the relay is energized, switch 434 is forced from its normally closed position to an open position, thereby interrupting the supply of power to the laser flashlamps.

For the second embodiment illustrated in FIG. 5, the switch in FIG. 7 must be configured to be normally open. In normal operation, the circuit will drive the relay so that the switch is closed. If the photodetector signal decreases, however, the voltage across resistor 404 also will decrease. When the voltage across the resistor falls below the predetermined threshold level, operational amplifier 410 will turn off thereby causing amplifier 416 to discontinue driving transistor 426. The switch therefore will open and power to the laser flashlamps will be interrupted.

Many other configurations for the circuit shown in FIG. 7 are possible.

While the present invention has been described with respect to specific embodiments, many modifications, variations, substitutions, and equivalents will be apparent to those skilled in the art. For example, the threshold could be set to a range of values rather than a discrete value. This could be achieved using well-known comparing circuits or even implemented in a computer. Accordingly, the invention is to be considered is limited only by the spirit and scope of the appended claims.

What is claimed is:

1. A monitoring system for monitoring operation of a laser system including optical components, said monitoring system comprising:

optical sensor means coupled to selected optical components, each respective optical sensor means being disposed to generate signals indicative of optical signal radial leakage of a respective optical component during operation said sensor means further comprising a photodetector mounted to an optical component and a laser diode mounted to the component and substantially 180° from said photodetector;

individual means for each optical component for determining if the magnitude of the radial leakage-indicative signal from each of said optical sensor means is within a predetermined threshold; and means for interrupting operation of the laser system if the radial leakage-indicative signal magnitude from an optical sensor means deviates from the predetermined threshold.

2. A monitoring system in accordance with claim 1 wherein said optical sensor means comprises at least one photodetector.

3. A monitoring system in accordance with claim 1 wherein said optical sensor means comprises at least one phototransistor.

4. A monitoring system in accordance with claim 1 wherein said optical sensor means comprises an optical fiber including an input end attached to an optical component and an output end disposed so that a signal emitted therefrom is detected by a photodetector.

5. A monitoring system in accordance with claim 1 wherein said optical sensor means comprises a plurality of optical fibers, each optical fiber end being attached to a respective optical component and each optical fiber output end being disposed so that a signal emitted therefrom is detected by a respective photodetector.

6. A monitoring system in accordance with claim 1 wherein said determining means comprises means for determining if the magnitude of a signal from the photodetector falls below the predetermined threshold.

7. A monitoring system in accordance with claim 1 wherein said determining means comprises means for determining if the magnitude of a signal from said optical sensor means exceeds the predetermined threshold.

8. A monitoring system in accordance with claim 1 wherein said determining means comprises an operation amplifier.

9. A monitoring system in accordance with claim 1 wherein said interrupting means comprises a relay switch coupled between a power supply and laser crystal flashlamp, said switch being normally closed to allow power to be supplied to the flashlamp and opening upon detection of the signal magnitude deviation.

10. A monitoring system for monitoring operation of laser system including optical components, said monitoring system comprising:

optical sensor means coupled to selected optical components, each respective optical sensor means being capable of generating signals indicative of optical signal radial leakage of a respective optical component said sensor means further comprising a photodetector mounted to an optical component and a laser diode mounted to said optical component and substantially 180° from said photodetector;

means for determining if the magnitude of a signal from each of said optical sensor means is within a predetermined threshold; and means for interrupting operation of the laser system if a signal magnitude from an optical sensor means deviates from the predetermined threshold.

11. A monitoring system in accordance with claim 10 wherein said optical sensor means comprises an optical fiber including an input end attached to an optical component and an output end disposed so that a signal emitted therefrom is detected by said photodetector.

12. A monitoring system in accordance with claim 10 wherein said optical sensor means comprises a plurality of optical fibers, each optical fiber input end being attached to a respective optical component and each optical fiber output end being disposed so that a signal emitted therefrom is detected by said photodetector.

13. A monitoring system in accordance with claim 10 wherein said determining means comprises means for determining if the magnitude of a signal from the photodetector falls below the predetermined threshold.

14. A monitoring system in accordance with claim 10 wherein said determining means comprises means for determining if the magnitude of a signal from said optical sensor means exceeds the predetermined threshold.

15. A monitoring system in accordance with claim 10 wherein said determining means comprises an operation amplifier.

16. A monitoring system in accordance with claim 10 wherein said interrupting means comprises a relay switch coupled between a power supply and laser crystal flashlamp, said switch being normally closed to allow power to be supplied to the flashlamp and opening upon detection of the signal magnitude deviation.

17. A laser system, comprising:

a laser head including a laser crystal and flashlamp for pumping the crystal; an optical fiber;

a beam injecting unit for injecting a beam output from said laser crystal into an input end of said optical fiber;

an output coupler, an output end of said optical fiber being disposed within said output coupler;

an optical component;

an optical sensor means coupled to said optical component, said optical sensor means being capable of generating signals indicative of optical signal radial leakage of said optical component; and said optical sensor means further comprising a photodetector mounted to an optical component and a laser diode mounted to said optical component and substantially 180° from said photodetector;

means for determining if the magnitude of a signal from said optical sensor means is within a predetermined threshold; and means for interrupting operation of the laser system if a signal magnitude from said optical sensor means deviates from the predetermined threshold.

18. A laser system in accordance with claim 17 wherein said determining means comprises an operational amplifier.

* * * * *